(12) United States Patent
Calmîc

(10) Patent No.: US 11,606,244 B2
(45) Date of Patent: Mar. 14, 2023

(54) LONGEST PATH FIRST ROUTE SELECTION

(71) Applicant: Cisco Technology, Inc., San Jose, CA (US)

(72) Inventor: Sergiu Calmîc, Brussels (BE)

(73) Assignee: CISCO TECHNOLOGY, INC., San Jose, CA (US)

( * ) Notice: Subject to any disclaimer, the term of this patent is extended or adjusted under 35 U.S.C. 154(b) by 118 days.

(21) Appl. No.: 17/164,094

(22) Filed: Feb. 1, 2021

(65) Prior Publication Data
US 2022/0247619 A1    Aug. 4, 2022

(51) Int. Cl.
*H04L 41/0668* (2022.01)
*H04W 40/12* (2009.01)

(52) U.S. Cl.
CPC ......... *H04L 41/0668* (2013.01); *H04W 40/12* (2013.01)

(58) Field of Classification Search
None
See application file for complete search history.

(56) References Cited

U.S. PATENT DOCUMENTS

| | | | |
|---|---|---|---|
| 10,887,225 B1* | 1/2021 | Chan | H04L 45/20 |
| 2002/0105914 A1 | 8/2002 | Duron | |
| 2006/0067217 A1 | 3/2006 | Li et al. | |
| 2017/0195218 A1* | 7/2017 | Schrum, Jr. | H04L 45/16 |
| 2017/0289270 A1* | 10/2017 | Li | H04L 41/0803 |
| 2019/0357301 A1* | 11/2019 | Li | H04W 80/10 |
| 2020/0053828 A1 | 2/2020 | Bharatia et al. | |
| 2020/0236604 A1 | 7/2020 | Li et al. | |
| 2021/0037410 A1* | 2/2021 | Lee | H04L 45/34 |

FOREIGN PATENT DOCUMENTS

WO    2020098334 A1    5/2020

OTHER PUBLICATIONS

Dinesh Kumar Tyagi et al., "Performance Evaluation of Path Length based Routing Strategies for Survivable WDM Network", Information and Communication Technology for Competitive Strategies, ACM, XP058267468, DOI:10.1145/2905055.2905171, ISB: 978-1-4503-3962-9, Mar. 2016, 6 pages.

(Continued)

*Primary Examiner* — Brian S Roberts
(74) *Attorney, Agent, or Firm* — Edell, Shapiro & Finnan, LLC

(57) ABSTRACT

Presented herein are techniques to manage a data network. A method includes receiving, at a first network device, a request to establish a path through a network from the first network device to a second network device, in response to the request, determining, from among a plurality of potential paths between the first network device and the second network device, a longest acceptable path between the first network device and the second network device, and sending data from the first network device to the second network device via the longest acceptable path between the first network device and the second network device. Because the longest acceptable path is first selected by default, if and when that longest acceptable path fails, a failover path will likely be shorter than the longest acceptable path thus likely improving, e.g., overall latency for the data being sent.

20 Claims, 8 Drawing Sheets

(56) References Cited

OTHER PUBLICATIONS

Kaippallimalil John et al., "Traffic Engineered Transport for 5G Networks", 2019 IEEE Conference on Standards for Communications and Networking (CSCN), IEEE, Oct. 2019, XP033673614, DOI:10.1109/CSCN.2019.8931385, 6 pages.
International Search Report and Written Opinion in counterpart International Application No. PCT/US2022/013607, dated Apr. 21, 2022, 14 pages.
"Critical Path Method," Wikipedia, https://en.wikipedia.org/wiki/Critical_path_method, retrieved from the Internet Aug. 1, 2022, 6 pages.
"Longest Path Problem," Wikipedia, https://en.wikipedia.org/wiki/Longest_path_problem, retrieved from the Internet Aug. 1, 2022, 7 pages.

* cited by examiner

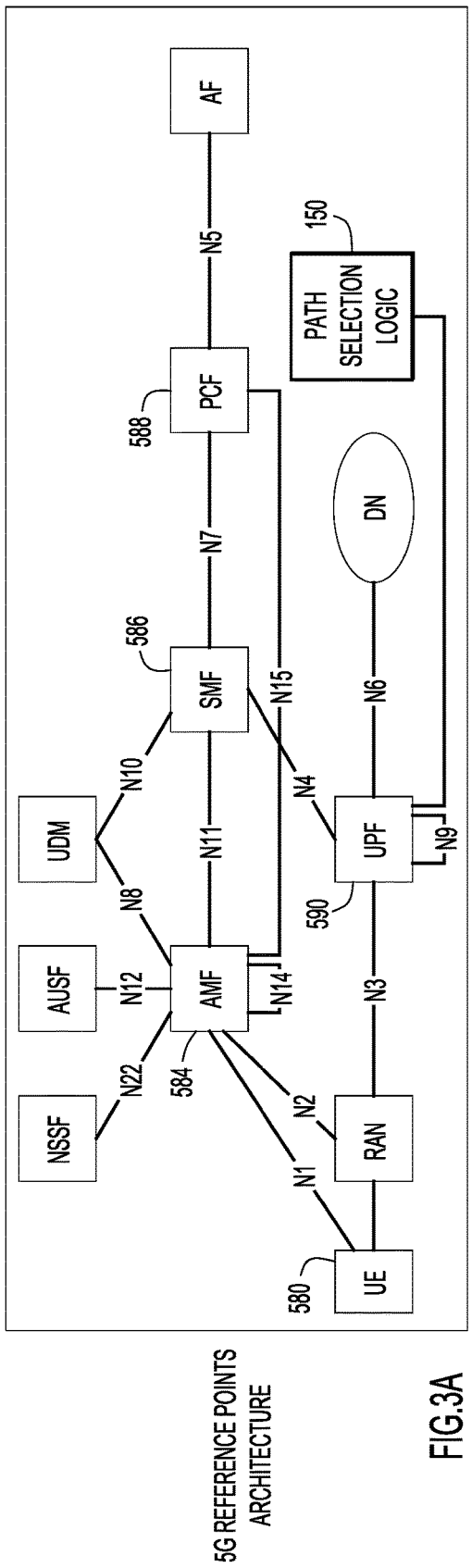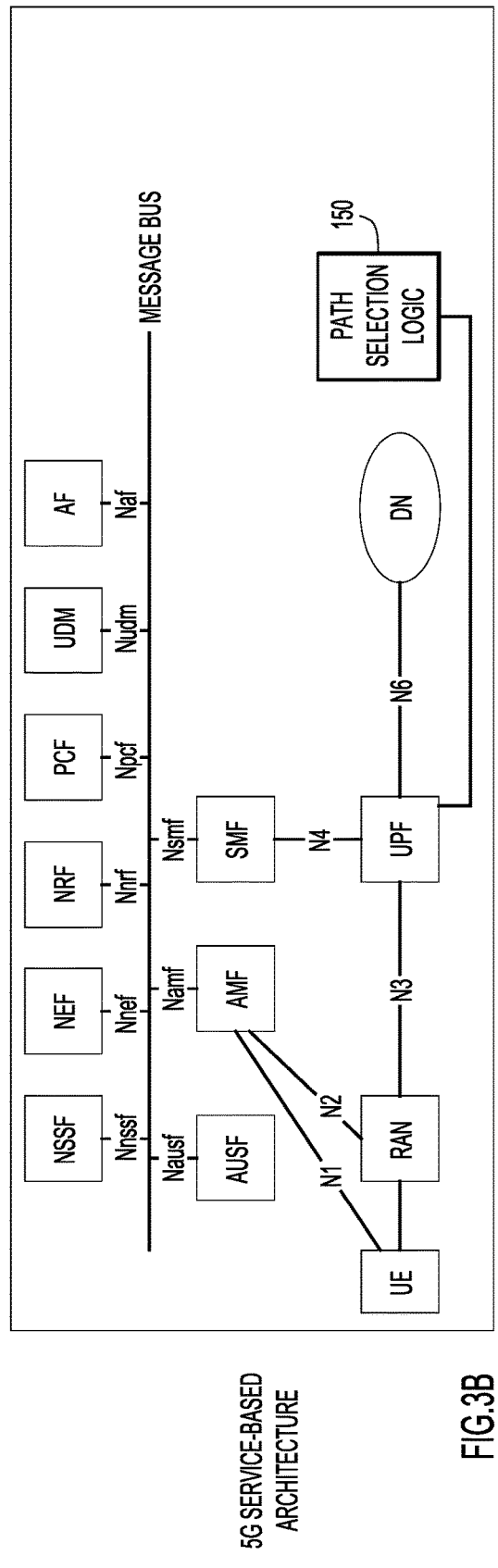
FIG.3A 5G REFERENCE POINTS ARCHITECTURE
FIG.3B 5G SERVICE-BASED ARCHITECTURE

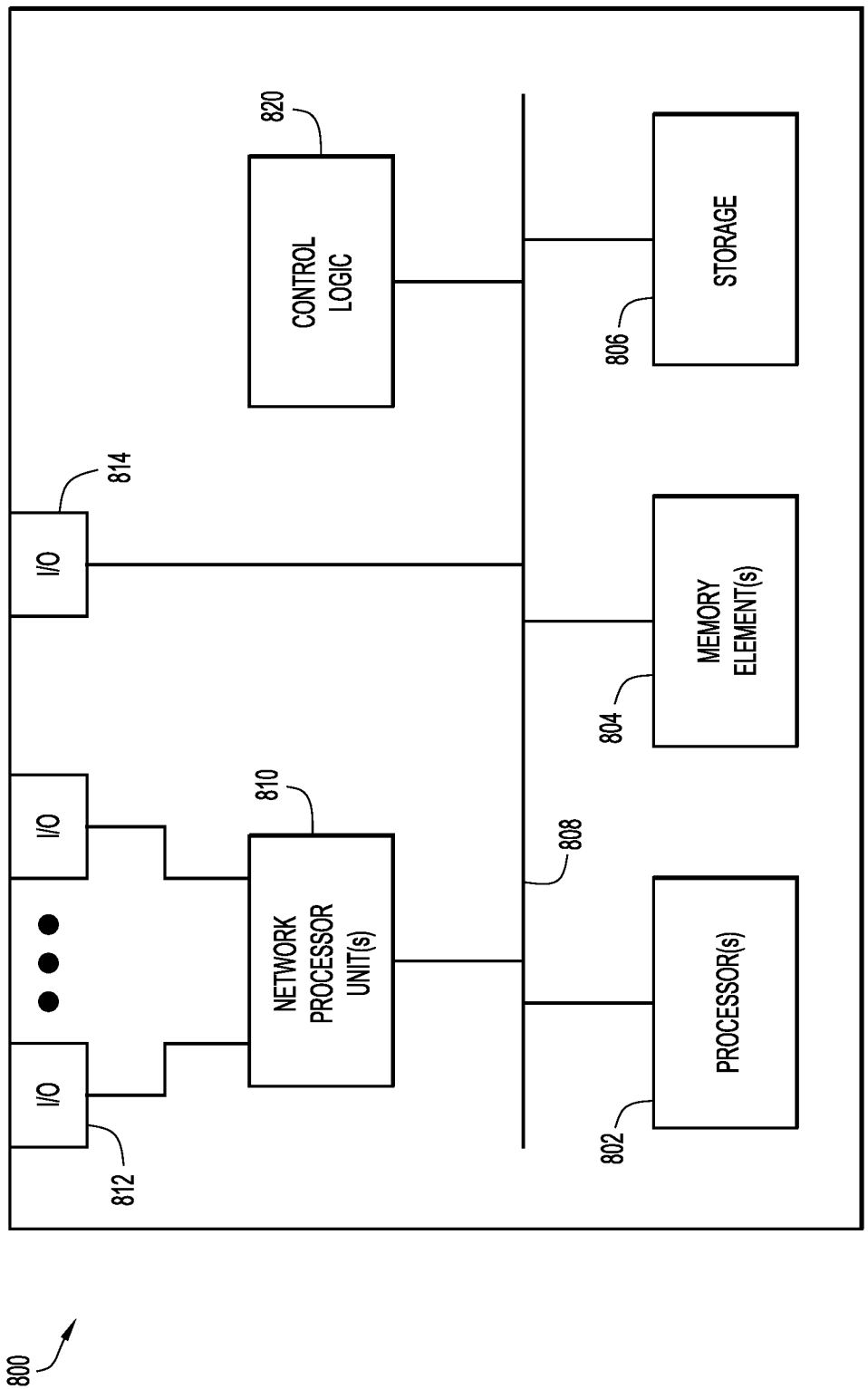

LONGEST PATH FIRST ROUTE SELECTION

TECHNICAL FIELD

The present disclosure relates to data network management.

BACKGROUND

A network data processing system is a system that transmits any combination of voice, video and/or data between users. Such a system includes cables and supporting hardware such as bridges, routers, and switches. In a wireless system, antennas and towers are also part of the network. Examples of network data processing systems include a local area network (LAN), a wide area network (WAN), and the Internet. End user devices may include, e.g., a mobile device, a computer, etc.

One of the critical areas for Internet access technologies (especially in wireless systems) is latency. On the one hand, latency can be a relative nuisance for users (e.g., slow loading video, lagging web browsing, etc.) yet, on the other hand, latency can be dangerous in the context of new applications such as, e.g., telemedicine and self-driving cars. To address latency in the wireless context, fifth generation (5G) cellular networks have promised to provide low latency. However, as currently implemented, when a failure occurs along a selected path through the network for given traffic, latency for that traffic often immediately becomes worse. Obviously, in the context of applications such as telemedicine and self-driving cars, unexpected or increased latency can be particularly problematic and/or dangerous.

BRIEF DESCRIPTION OF THE DRAWINGS

FIGS. 3A and 3B show a high level 5G infrastructure along with path selection logic according to an example embodiment.

FIG. 8 illustrates a hardware block diagram of a computing device that may perform one or more functions of path selection logic as described in connection with FIGS. 1-7.

DESCRIPTION OF EXAMPLE EMBODIMENTS

Overview

Presented herein are techniques to manage a data network. A method includes receiving, at a first network device, a request to establish a path through a network from the first network device to a second network device, in response to the request, determining, from among a plurality of potential paths between the first network device and the second network device, a longest acceptable path between the first network device and the second network device, and sending data from the first network device to the second network device via the longest acceptable path between the first network device and the second network device. Because the longest acceptable path is first selected by default, if and when that longest acceptable path fails, a failover path will likely be shorter than the longest acceptable path thus likely improving, e.g., overall latency for the data being sent.

In another embodiment, an apparatus is provided. The apparatus may include a network interface configured to enable network communications, a memory configured to store logic instructions, and a processor, when executing the logic instructions, configured to receive a request to establish a path through a network from the apparatus to a network device, in response to the request, determine, from among a plurality of potential paths between the apparatus and the network device, a longest acceptable path between the apparatus and the network device, and send data from to the network device via the longest acceptable path between the apparatus and the network device. Because the longest acceptable path is first selected by default, if and when that longest acceptable path fails, a failover path will likely be shorter than the longest acceptable path thus likely improving, e.g., overall latency for the data being sent.

EXAMPLE EMBODIMENTS

As will be explained in more detail below, embodiments described herein instantiate a routing paradigm that installs in a routing table the longest (worst) path for specific prefixes. In this way, a path selected for a given type of traffic will be, by default, the longest or worst possible, i.e., the latency and the quality of the connection will be the worst possible, yet still within an acceptable range. As such, in the event of a failure along the path, any new path that is selected will have lower, or at the least a no-worse, latency, as opposed to a worse connection quality, which is the case with a traditional path selection process.

Figure 1:
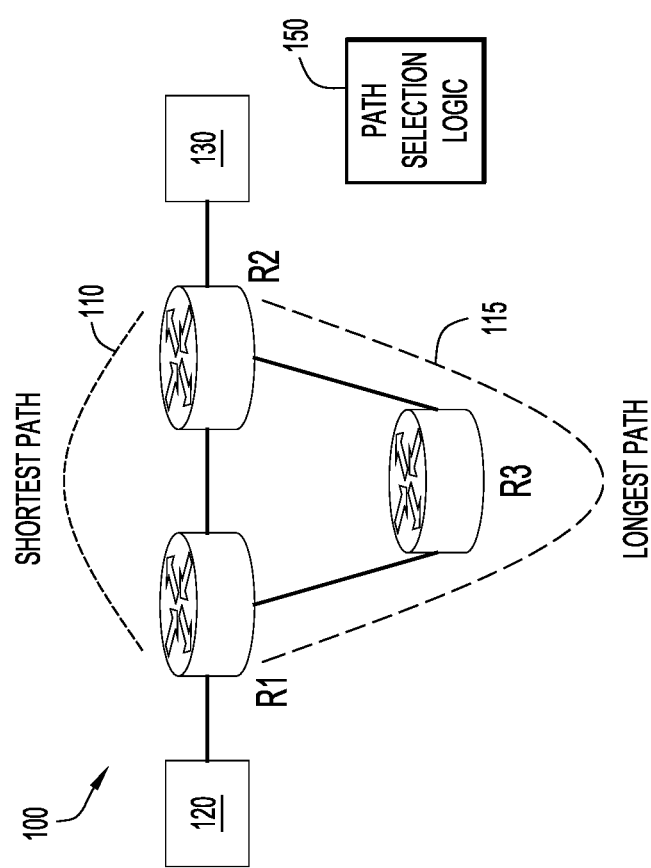
FIG. 1 shows a network with a shortest path and a longest path between two end points, along with path selection logic, according to an example embodiment.

FIG. 1 shows a network with a shortest path and a longest path between two end points, along with path selection logic, according to an example embodiment. More specifically, routers R1, R2, and R3 comprise an example network 100 between end point 120 and end point 130. A shortest path 110 between end point 120 and end point 130 is via router R1 and router R2. In contrast, a longest path 115 between end point 120 and end point 130 is via router R1, router R3, and then router R2. In accordance with the embodiments described herein, router forwarding tables are configured by path selection logic 150 to select the path R1→R3→R2, i.e., the longest path 115 as an initial (or default) path between end point 120 and end point 130.

Figure 2:
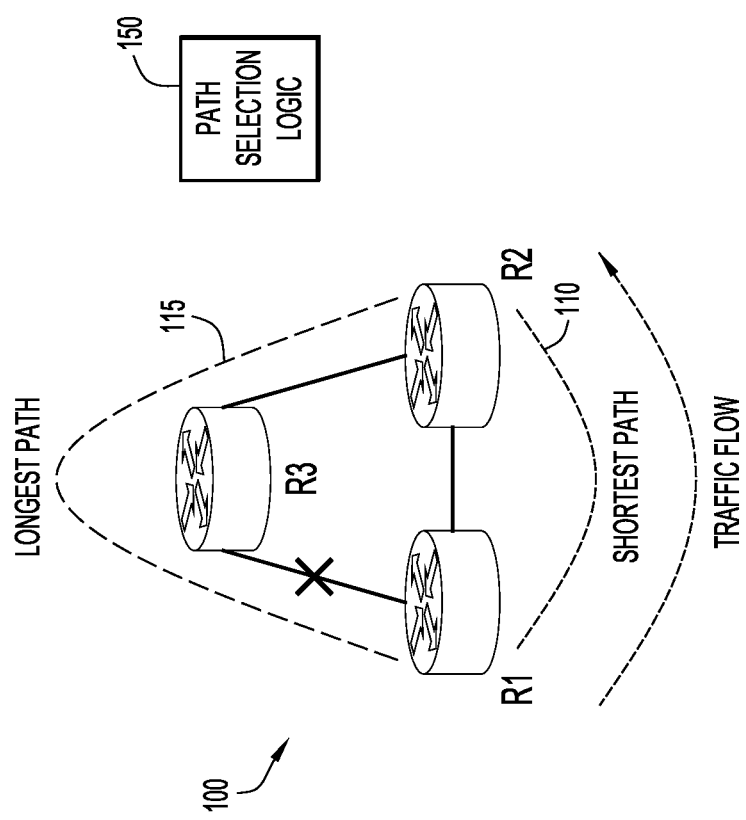
FIG. 2 shows the same network as FIG. 1, along with path selection logic, but where the longest path has been disrupted, causing traffic to be re-routed via the shortest path between the two end points according to an example embodiment.

FIG. 2 shows the same network 100 as FIG. 1, along with path selection logic 150, but where the longest path 115 has been disrupted, causing traffic, in accordance with path selection logic 150 and configured routing tables, to be re-routed via the shorter (or shortest) path 110, i.e., a failover path, between the two end points according to an example embodiment. That is, the (worst) longest path 115 (R1→R3→R2) is no longer available, causing traffic, in accordance with configuration instructions from path selection logic 150, to fail over to (better/best) shorter/shortest path 110 (R1→R2).

Path selection logic 150 may be deployed, for example, in a controller of a software defined network (SDN) where such a controller is in communication with routers R1, R2, and R3 via, e.g., a control plane (not shown), and is configured to modify and/or update forwarding tables of routers R1, R2, and R3 to ensure that communication between end point 120 and end point 130 is initially arranged to follow the (worst) longest path 115.

Internet Control Message Protocol (ICMP) test results from a lab experiment for traffic running via (best) shortest path 110 and longest (worst) path 115 is set forth below (where 1.1.1.1 is a loopback on R1, and 2.2.2.2 is a loopback on R2).

Shortest (Best) Path 110 (R1→R2):
R1#ping 2.2.2.2 source 1.1.1.1
Type escape sequence to abort.
Sending 5, 100-byte ICMP Echos to 2.2.2.2, timeout is 2 seconds:
Packet sent with a source address of 1.1.1.1
!!!!!
Success rate is 100 percent (5/5), round-trip min/avg/max=1/1/1 ms Longest (Worst) Path 115 (R1→R3→R2):
R1#ping 2.2.2.2 source 1.1.1.1
Type escape sequence to abort.
Sending 5, 100-byte ICMP Echos to 2.2.2.2, timeout is 2 seconds:
Packet sent with a source address of 1.1.1.1
!!!!!
Success rate is 100 percent (5/5), round-trip min/avg/max=1/1/2 ms It is noted that, although the network topology described and evaluated above is extremely simple and the difference between the paths comprises only one router and one link difference, there is, nevertheless, a 1 ms impact on the round-trip time.

Longest (worst) path routing can be implemented in a number of ways, including:

1. Separate Protocol: a protocol, perhaps similar to functionality associated with Open Shortest Path First (OSPF), may be configured to install in the relevant routing tables the longest path, as opposed to the shortest path;

2. A new operating mode for a given routing protocol: an operating mode that causes a given routing protocol to install in the relevant routing tables a worst or longest path for certain prefixes (while still avoiding routing loops);

3. An extension of Traffic Engineering; and/or

4. A "tag" for the prefix (in, e.g., a border gateway protocol (BGP) implementation) to mark it as "longest path suitable," and thus to instruct the routing protocols to use the worst or longest route criteria for this prefix.

Longest path routing can have several applications. For example:

Network Testing: When deploying a new network or new service, a routing protocol, executed by path selection logic 150, may be run in "longest path" mode to test the network behavior for a worst case scenario. This can be an automatic network test for continuous integration/continuous delivery (CI/CD) if, e.g., a user (customer) deploys the network in a staging (development) environment first. Traditionally, this sort of test is implemented manually by disabling selected links.

Latency critical applications: Assume a telemedicine use case. Before starting a remote surgery, path selection logic 150 assesses the connectivity quality, so a surgeon will not start the surgery if the connection quality is below a predetermined threshold. If connection quality is above the predetermined threshold with the "longest path" mode enabled, the surgery can be started. The probability of the connection getting worse will be very low as failures along the path of the traffic will lead mostly to enhancing the quality of the connection, as opposed to reducing the quality as would occur with a traditional approach (i.e., selecting a best or shortest path first).

Unequal cost load balancing: It is possible to configure path selection logic 150 to direct via the "longest path" all the traffic that is not delay sensitive. This frees up resources for critical traffic to go via a better/best path. In one implementation, path selection logic 150 directs only traffic from specifically marked prefixes via the longest (worst) path.

Mobility (e.g., Fifth Generation (5G) Mobile Networking Applications

As noted, a promising feature of 5G is its low latency performance. 5G infrastructure is thus well-suited for applications such as autonomous driving, remote surgery, augmented reality, drone control, among others. At its core, a 5G network relies on an underlying Layer 3 network via which hardware appliances, virtual machines and containers connect to one another. FIGS. 3A and 3B show a high level 5G infrastructure along with path selection logic according to an example embodiment. As will be explained in connection with FIG. 5, several elements in a N3 backhaul segment of the 5G architecture can be leveraged to enable longest path selection for that portion of the network.

In FIGS. 3A and 3B the functional blocks include Access and Mobility Management Function (AMF) 584, Session Management Function (SMF) 586, User Plane Function (UPF) 590, Network Exposure Function (NEF), NR Repository Function (NRF), Network Slice Selection Function (NSSF), Unified Data Function (UDM), Authentication Server Function (AUSF), Policy Control Function (PCF), Application Function (AF), Radio Access Network (RAN), and Data Network (DN).

In many cases, connections between the several functional blocks or logical nodes in FIGS. 3A and 3B are not direct, but are instead performed via several intermediary nodes, e.g., routers and switches. Furthermore, the paths can be divided into two broad categories: the user plane and the control plane. The following discussion is focused on longest path routing applications for the user plane.

The user plane can be divided into 3 segments: Segment1: Radio, Segment2: the N3 interface between the gNB 582 (i.e., the radio access network (RAN) base station) and UPF 590, and Segment3: the N6 interface between the UPF 590 and a data network (DN).

Figure 4:
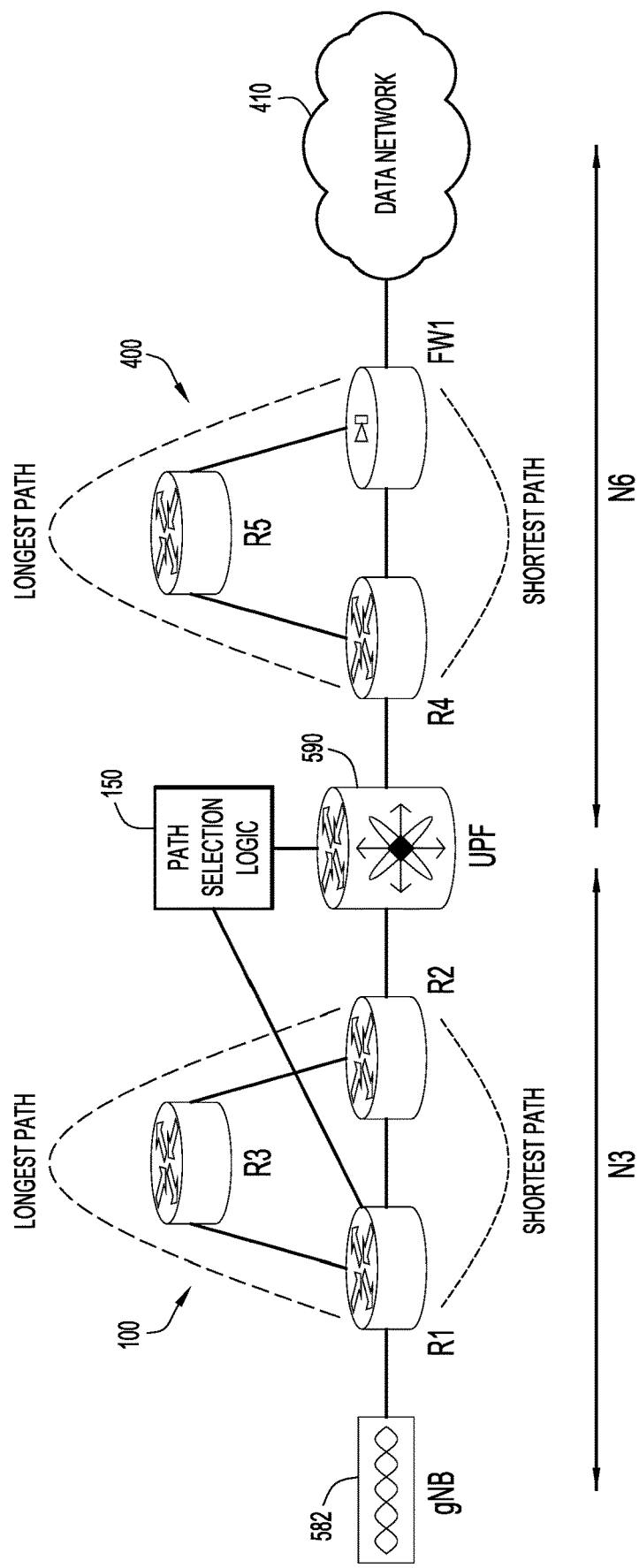
FIG. 4 shows the application of path selection logic to N3 traffic in a 5G infrastructure according to an example embodiment.

In accordance with an embodiment, a longest path first (LPF) route selection approach, implemented by path selection logic 150, may be applied, e.g., to N3 traffic, as shown in FIG. 4. More specifically, N3 traffic to/from gNB 582 (i.e., RAN in FIGS. 3A and 3B) may pass through network 100 (including routers R1, R2, and, possibly, R3), and N6 traffic may pass through a network 400 including routers R4 and R5 and firewall FW1, which is in communication with data network (DN) 410.

The N3 segment is also called the mobile "backhaul" and is typically an extensive multi-protocol label switching (MPLS) based network with traffic engineering (TE) on top, hence relying at its core on a link state protocol such as the Open Shortest Path First (OSPF) protocol or the Intermediate System—Intermediate System (ISIS) protocol. Traffic across N6 is typically routed via border gateway protocol (BGP).

As MPLS and traffic engineering is often deployed for the N3 interface, path selection logic 150 is configured, in one embodiment, to alter the TE behavior to perform longest (worst) path selection.

The user plane traffic over N3 is General Packet Radio Service (GPRS) Tunneling Protocol (GTP) encapsulated, hence the intermediary routers have visibility only on UPF 590 and gNB 582 IP addresses and not the actual UE 580 IP address. To overcome this constraint, path selection logic 150 is configured to employ two N3 loopbacks on UPF 590 and to implement a modified version of MPLS TE.

For purposes of context, to implement classical traffic engineering, the Resource Reservation Protocol Traffic Engineering (RSVP TE) is used. The ingress label switched router (LSR, e.g., R1) computes a traffic engineering database (TE DB) based on the topology information from the underlying link state protocol (LSP) and uses this information to compute the shortest path that meets given constraints towards the TE tunnel destination, using the Constrained Shortest Path First (CSPF) algorithm. Afterwards, RSVP TE reserves the compiled path using an ERO (Explicit Route Object).

In contrast to classical traffic engineering, and in accordance with an embodiment, path selection logic 150 uses a modification of CSPF that, instead, computes the longest/worst path that still meets predetermined minimum criteria. For purposes of discussion, this modified version of CSPF, executed by path selection logic 150, is referred to herein as "longest path first" (LPF).

LPF is configured to use the same data from the TE DB as the CSPF algorithm, but choses the longest path, as opposed to the shortest path. Afterwards, regular TE tunnel resource reservation applies with the ERO compiled based on LPF.

To implement LPF for the N3 interface, support for LPF is also deployed on UPF 590 and a router (e.g., R1) connected directly to gNB 582. The rest of the network may continue to support traditional MPLS TE.

As noted above, path selection logic 150 configures UPF 590 to have two N3 loopbacks: a best path loopback and a longest path loopback. With path selection logic 150 in place, UPF 590 signals to the backhaul network that, for certain prefixes, a worst (e.g., longest) path should be selected. After this signaling, the traffic to and from the UE 580 is routed via the worst or longest path determined by path selection logic 150 executing LPF.

Figure 5:
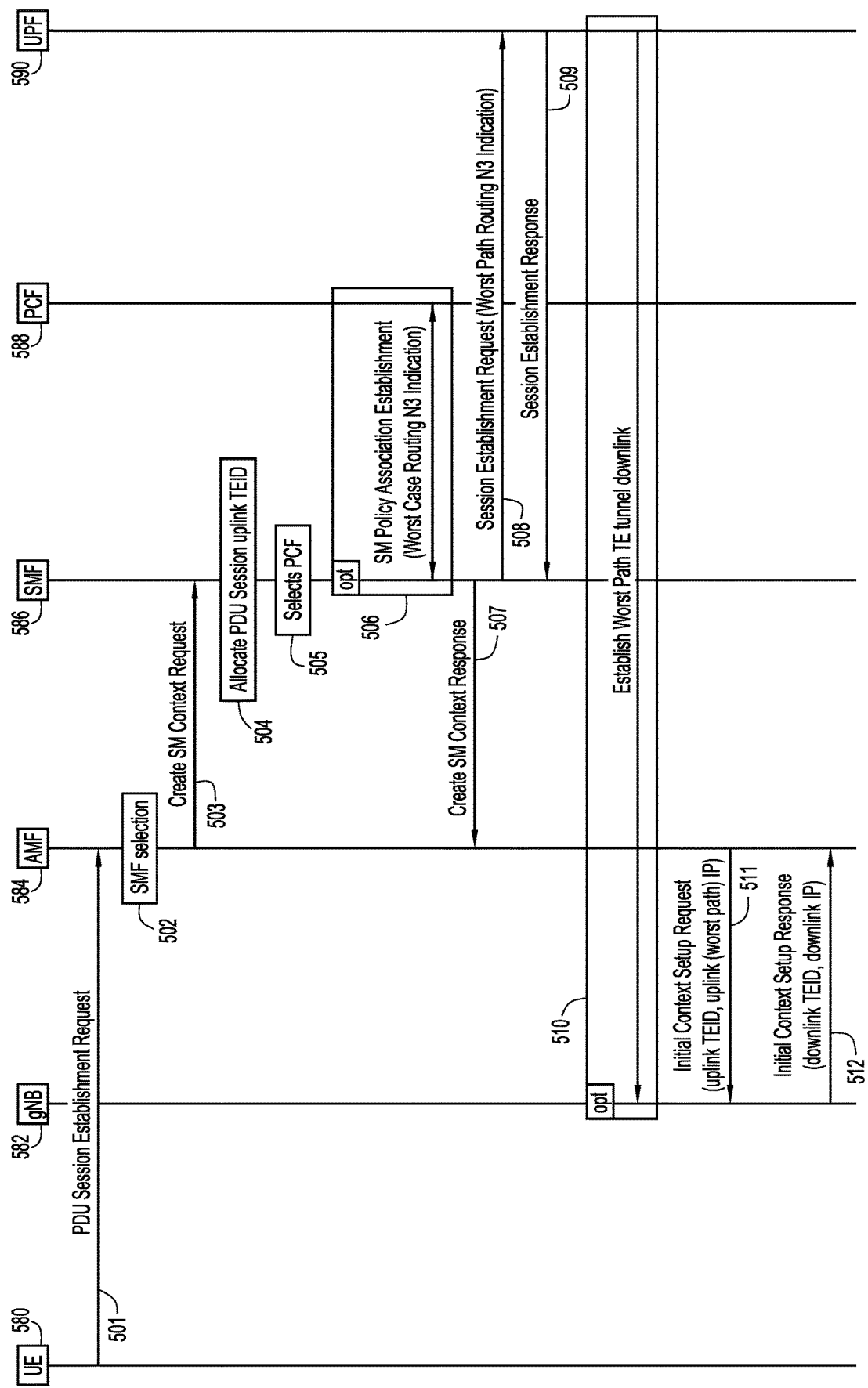
FIG. 5 is a ladder diagram depicting a series of steps within a 5G infrastructure for selecting a longest path in accordance with an example embodiment.

FIG. 5 is a ladder diagram depicting a series of steps for selecting a longest path in accordance with an example embodiment. At 501, UE 580 initiates a new protocol data unit (PDU) session. The request reaches AMF 584, via gNB 582. At 502, AMF 584 selects SMF 586 and sends a create SMC context request 503. At 504, SMF 586 allocates a PDU session uplink traffic engineering ID (TEID). At 505, SMF 586 selects a PCF 588 for the session.

At 506, SMF 586 optionally communicates with PCF 588 that the user traffic for this specific session should go via the worst (e.g., longest) path. At 507, SMF 586 returns a Create SMContext Response to AMF 584.

At 508, SMF 586 selects UPF 590 and informs UPF 590 that the (N3) traffic will be via the longest/worst path, and provides the address of gNB 582. In turn, UPF 590, at 509, sends a session establishment response and, at 510, using the LPF algorithm executed by path selection logic 150, sets up a MPLS TE tunnel towards gNB 582 via the worst (e.g., longest) path. This tunnel will be used for downlink data. At 511, AMF 584 sends an initial context setup request including uplink TEID and uplink (worst path) IP address. For uplink data, and in accordance with an embodiment, the router connected directly to gNB 582 will already have a longest/worst path MPLS TE tunnel configured towards the worst path loopback of UPF 590. At 512, gNB 582 sends an initial context setup response including downlink TEID and downlink IP address.

Thus, at the completion of the operations of FIG. 5, traffic to and from the UE 580 is routed via the worst or longest path.

Stated alternatively, at session setup, SMF 586 selects the UPF 590. Then SMF 586 informs UPF 590 of the gNB 582 IP address, and gNB 582 of the UPF 590 address. With this address information, a GPRS Transport Protocol User Plane (GTPU) tunnel is established between gNB 582 and UPF 590. Data plane traffic is sent via this tunnel. As those skilled in the art appreciate, traffic engineering tunnels are unidirectional. Hence, two tunnels, gNB→UPF (uplink) and UPF→gNB (downlink), are established.

Traditionally, the UPF N3 service operates over a single interface. However, in accordance with an example embodiment, UPF N3 service runs on two interfaces: a first interface terminates traditional sessions, and a second interface terminates LPF sessions.

In accordance with one embodiment, two longest path tunnels (uplink and downlink) are pre-built between gNB 582 (actually the router, e.g., R1, directly connected to gNB 582) and UPF 590. Alternatively the downlink tunnel can be set up on-demand at session establishment. When a "longest path" session is to be established, SMF 586 communicates the longest path UPF 590 interface IP address to gNB 582. gNB 582 then sends traffic towards this destination IP address. The next hop router (e.g., R1) will send the uplink traffic via this tunnel, based on traffic destination IP.

For downlink traffic, UPF 590 knows the gNB 582 IP address and that the session is to be "longest path." Based on this knowledge, UPF 590 sends the downlink traffic via the downlink longest path tunnel.

Those skilled in the art will appreciate that, in accordance with the embodiments described herein, gNB 582 is not aware of the longest path, mobile backhaul routers support longest path routing under the control of path selection logic 150, and UPF 590 supports longest path routing also under the control of path selection logic 150. Also, in one implementation, an additional attribute value pair (AVP) in, e.g., a Policy and Charging Rules Function (PCRF) user profile (or any other appropriate user profile) may indicate the desire for longest path routing, SMF 586 is configured to be responsive to such an AVP and use it (along with other criteria) to select the UPF 590, and SMF 586 is further configured to indicate to UPF 590 that it is to implement longest path routing for a given session.

Those skilled in the art will also appreciate that the longest path routing approach described herein may also be applied to a 4G Control and User Plane Separation (CUPS) architecture wherein, instead of SMF 586 and UPF 590, a control plane (CP) and user plane (UP) are employed. The longest path routing described herein may still also be applied to more traditional 4G architecture wherein the tunnel will be terminated on serving gateway (SGW).

Moreover, the longest path routing approach described herein may be implemented in other types of networks including, e.g., enterprise or cable Internet service providers (ISPs), as long as the relevant nodes are aware of worst path routing and there is a mechanism in place to trigger it (e.g., CLI command, API call from a controller, etc.). The LPF approach can be used also as a mechanism to trigger unequal cost load balancing, i.e., to direct selected traffic via the worst cost, and thus unutilized links, freeing up the path for critical traffic from congestion.

OTHER CONSIDERATIONS

Path selection logic 150 cannot necessarily simply install the worst or longest route into routing tables and automatically expect to achieve a loop free network (as each router might operate to select a worst path). To avoid undesirable loops, MPLS Traffic Engineering Longest Path Tunnels may be employed.

At a high level, path selection logic 150 leverages traditional MPLS Traffic Engineering with a modified algorithm to compute an Explicit Route Object (ERO), namely, as noted above, LPF (longest path first) instead of CSPF. Notably, no modification to Interior Gateway Protocols (IGPs) are needed. With LPF, an Ingres label switched router (LSR), will pick the longest path that meets the criteria for the tunnel (loop free, bandwidth, etc.). As the Ingress LSR (also autonomous system (AS) boundary router (ABR or ASBR) when the traffic traverses several areas or ASs) has the information regarding network topology and since it is the one deciding the path of the traffic via path selection logic 150, the path will be loop free.

If the routers are inside the same MPLS backbone network, the path will be constructed as a regular MPLS TE tunnel would, albeit with the worst or longest paths picked inside the same areas. More specifically, traditional traffic engineering runs over MPLS enabled networks where a link state protocol (e.g., OSPF or ISIS) is enabled. With such a link state routing protocol, each router is aware of the full topology of the network. MPLS TE leverages this to build the Traffic Engineering Database where network topology along with link bandwidths are stored.

When a traditional MPLS TE tunnel is built (between the Ingress LSR, e.g., R1, and an Egress LSR, e.g., R2), the Ingress LSR computes the best path meeting some additional criteria (e.g., available bandwidth, latency) towards the Egress LSR. The Ingress LSR may use a modified version of SPF (Shortest Path First) algorithm called CSPF—Constrained SPF. With the result of CSPF, the Ingress LSR uses RSVP-TE to signal the desired resulting LSP towards the network. It does so by computing a special object Explicit Route Object (ERO) that is included in RSVP Path message. This ERO contains the explicit path the tunnel has to make. The ERO message is not sent via the normal routing path, but to each of the nodes listed in the ERO. If the receiving router has the required resources, it allocates a MPLS label for the flagged prefix and forwards the ERO to the next router, removing itself from the list. The path messages also use the Record Route Object (RRO) to record the path of the PATH message, to avoid loops.

Note that, de facto, it is the Ingress LSR (head end router, e.g., R1) that defines the path towards the Egress LSR (tail end router, e.g., R2) in the context of a single continuous OSPF area. When several areas are traversed, each ABR runs its own instance of CSPF.

The embodiments described herein leverage the foregoing routing algorithms. Notably, no changes are made to underlying IGPs, although a link state protocol is needed. The Ingress LSR (e.g., R1) is informed (via, e.g., a configuration command, API call, etc.) that the traffic is to be routed via the longest (or worst) path. Since the Ingress LSR knows the topology, path selection logic 150 executing thereon computes a loop free longest (or worst) path towards the Egress LSR (e.g., R2) and the respective ERO object. In the event the tunnel traverses several areas, path selection logic 150 flags a path message to signal that the traffic should be routed via the longest or worst route. This may be implemented by using one of the reserved bits in an ERO sub-objects (IPv4, IPv6) to flag the ERO as longest/worst path. The flag is used to inform the ABRs that the longest or worst path should be computed for this tunnel. The longest path is then signaled across the network as regular RSVP TE PATH messages (with longest path indicator bits set in the ERO).

It is noted that the longest path may be computed for a given prefix only inside a given area. Inter-area traffic may still be routed via a best path. Thus, as the path is computed by the Ingress LSR (and ABRs) leveraging the knowledge of the network topology, it will be loop free, while being the longest or worst path that meets predetermined requirements (e.g., bandwidth).

Figure 6:
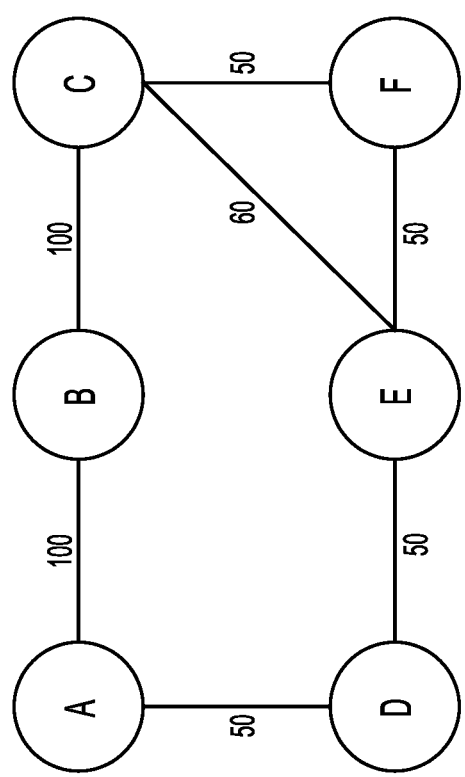
FIG. 6 is an example network including costs for each link, which may be used by path selection logic in accordance with an example embodiment.

FIG. 6 is an example network including costs for each link, which may be used by path selection logic 150 in accordance with an example embodiment. Consider a case where path selection logic 150 must compute a route or path from router A to router C that satisfies bandwidth constraint of x-units, and link cost for each link is based on hop-count (i.e., 1).

The longest path first approach described herein, executed by path selection logic 150 on router A, for example, computes several possible paths.
1. A-B-C
2. A-D-E-C
3. A-D-E-F-C If x (required bandwidth) is 50, path selection logic 150 selects the longest path that meets the requirements, namely a path that includes routers A-D-E-F-C.

If x is 90 then path selection logic 150 selects the longest path that meets that requirement, namely a path that includes routers A-B-C.

In the case of a tunnel that traverses multiple areas, LPF is executed on the head-end router and also on each ABR. The head-end router will still pick the best ABR as an exit point from the area (as it would pick with the best path routing) and will create a worst path tunnel towards this ABR. That ABR then creates the longest or worst path tunnel towards the next best ABR or destination.

Figure 7:
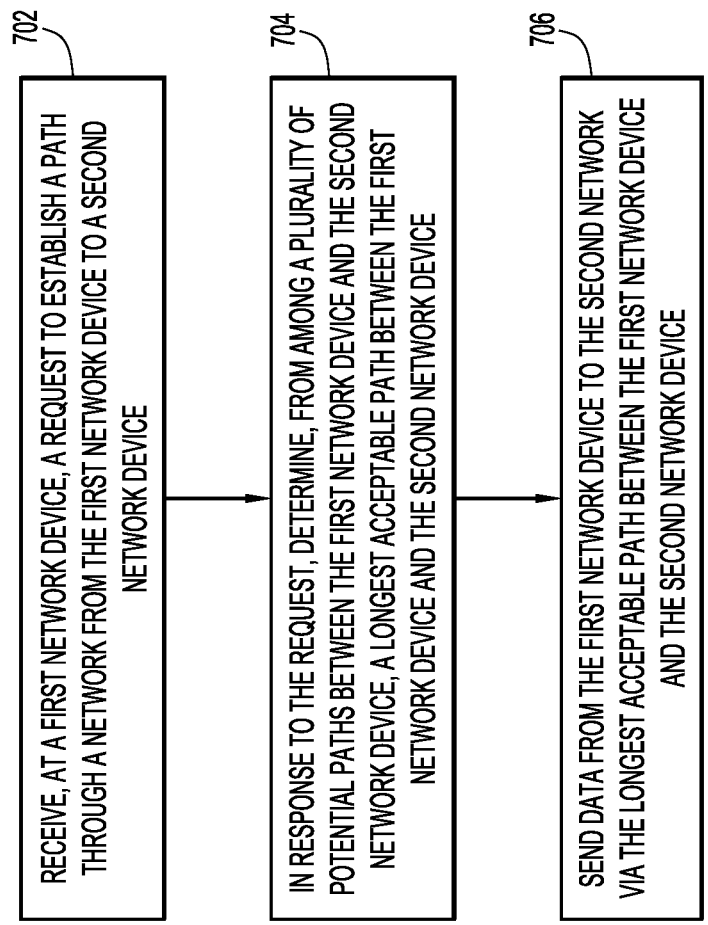
FIG. 7 is a flowchart depicting operations that may be executed by path selection logic according to an example embodiment.

FIG. 7 is a flowchart depicting operations that may be executed by path selection logic 150 according to an example embodiment. At 702, a first network device (e.g., an apparatus, such as a router attached to a gNB in a 5G infrastructure) receives a request to establish a path through a network from the first network device to a second network device. At 704, in response to the request, the first network device is configured to determine, from among a plurality of potential paths between the first network device and the second network device, a longest acceptable path between the first network device and the second network device. And, at 706, the first network device sends data from the first network device to the second network via the longest acceptable path between the first network device and the second network device. Because the longest acceptable path is first selected by default, if and when that longest acceptable path fails, a failover path will likely be shorter than the longest acceptable path thus likely improving, e.g., overall latency for the data being sent.

In sum, to ensure high service quality for latency critical applications a new routing paradigm is provided that uses, as a default, the longest or worst path for specific prefixes. In this case the path selected for a given type of traffic will have the "worst possible" latency and quality of the connection. A failure on the path will thus lead to an increased connection quality (as opposed to a worse connection quality with the traditional approach) hence the connection quality will not degrade when path failures occur. The described approach can be used to test networks or run latency critical applications such as remote surgery.

FIG. 8 illustrates a hardware block diagram of a computing device 800 that may perform functions associated with operations discussed herein in connection with the techniques described in connection with FIGS. 1-7. In various embodiments, a computing device, such as computing device 800 or any combination of computing devices 800, may be configured as any entity/entities (e.g., router, UPF) as discussed for the techniques described in connection with FIGS. 1-7 in order to perform operations of the various techniques discussed herein.

In at least one embodiment, the computing device 800 may include one or more processor(s) 802, one or more memory element(s) 804, storage 806, a bus 808, one or more network processor unit(s) 810 interconnected with one or more network input/output (I/O) interface(s) 812, one or more I/O interface(s) 814, and control logic 820. In various embodiments, instructions associated with logic for computing device 800 can overlap in any manner and are not limited to the specific allocation of instructions and/or operations described herein. That is, control logic 820 may embody instructions to execute path selection logic 150.

In at least one embodiment, processor(s) 802 is/are at least one hardware processor configured to execute various tasks, operations and/or functions for computing device 800 as described herein according to software and/or instructions configured for computing device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 804 and/or storage 806 is/are configured to store data, information, software, and/or instructions associated with computing device 800, and/or logic configured for memory element(s) 804 and/or storage 806. For example, any logic described herein (e.g., control logic 820) can, in various embodiments, be stored for computing device 800 using any combination of memory element(s) 804 and/or storage 806. Note that in some embodiments, storage 806 can be consolidated with memory element(s) 804 (or vice versa), or can overlap/exist in any other suitable manner.

In at least one embodiment, bus 808 can be configured as an interface that enables one or more elements of computing device 800 to communicate in order to exchange information and/or data. Bus 808 can be implemented with any architecture designed for passing control, data and/or information between processors, memory elements/storage, peripheral devices, and/or any other hardware and/or software components that may be configured for computing device 800. In at least one embodiment, bus 808 may be implemented as a fast kernel-hosted interconnect, potentially using shared memory between processes (e.g., logic), which can enable efficient communication paths between the processes.

In various embodiments, network processor unit(s) 810 may enable communication between computing device 800 and other systems, entities, etc., via network I/O interface(s) 812 to facilitate operations discussed for various embodiments described herein. In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 800 and other systems, entities, etc. to facilitate operations for various embodiments described herein. In various embodiments, network I/O interface(s) 812 can be configured as one or more Ethernet port(s), Fibre Channel ports, and/or any other I/O port(s) now known or hereafter developed. Thus, the network processor unit(s) 810 and/or network I/O interface(s) 812 may include suitable interfaces for receiving, transmitting, and/or otherwise communicating data and/or information in a network environment.

I/O interface(s) 814 allow for input and output of data and/or information with other entities that may be connected to computer device 800. For example, I/O interface(s) 814 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 820 can include instructions that, when executed, cause processor(s) 802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 820) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software (potentially inclusive of object code and source code), etc.) for execution by one or more processor(s), and/or other similar machine, etc. Generally, memory element(s) 804 and/or storage 806 can store data, software, code, instructions (e.g., processor instructions), logic, parameters, combinations thereof, and/or the like used for operations described herein. This includes memory element(s) 804 and/or storage 806 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi@/Wi-Fi6@), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of and' one or more of can be represented using the '(s)' nomenclature (e.g., one or more element(s)).

In sum, in one embodiment a method is provided. The method includes receiving, at a first network device, a request to establish a path through a network from the first network device to a second network device; in response to the request, determining, from among a plurality of potential paths between the first network device and the second network device, a longest acceptable path between the first network device and the second network device; and sending data from the first network device to the second network device via the longest acceptable path between the first network device and the second network device.

The method may further include determining that the longest acceptable path has failed and, in response, automatically selecting a failover path that is shorter than the longest acceptable path.

The method may also include defining the longest acceptable path as a path that meets predetermined bandwidth and latency constraints for transmitting the data.

In one embodiment, the method includes setting up the longest acceptable path using traffic engineering.

In one implementation, the data comprises N3 traffic between a gNB and a user place function (UPF) in a 5G infrastructure network.

The method may still further include receiving the request from the UPF.

The longest acceptable path may be a downlink path between the UPF and the gNB.

In an embodiment, the UPF includes a first downlink interface towards the gNB that supports the longest acceptable path, and a second downlink interface towards the gNB that supports a shortest path among the plurality of potential paths between the first network device and the second network device.

The method may still further include establishing a longest path uplink traffic engineering tunnel between the gNB and the UPF separate from the downlink path between the UPF and the gNB.

The method may also include setting a flag in an Explicit Route Object (ERO) of a path message to indicate to an autonomous system boundary router (ABR) that the data is to be routed via a longest path.

In another embodiment, an apparatus is provided. The apparatus includes a network interface configured to enable network communications; a memory configured to store logic instructions; and a processor, when executing the logic instructions, configured to: receive a request to establish a path through a network from the apparatus to a network device; in response to the request, determine, from among a plurality of potential paths between the apparatus and the network device, a longest acceptable path between the apparatus and the network device; and send data to the network device via the longest acceptable path between the apparatus and the network device.

The processor may be further configured to determine that the longest acceptable path has failed and, in response, automatically select a failover path that is shorter than the longest acceptable path.

In an embodiment, the longest acceptable path is defined as a path that meets predetermined bandwidth and latency constraints for transmitting the data.

The processor may still be further configured to set up the longest acceptable path using traffic engineering.

In an embodiment, the data comprises N3 traffic between a gNB and a user place function (UPF) in a 5G infrastructure network.

The processor may be further configured to receive the request from the UPF.

In one implementation, the longest acceptable path is a downlink path between the UPF and the gNB.

A non-transitory computer readable storage media encoded with instructions is also provided. The non-transitory computer readable storage media is encoded with instructions that, when executed by a processor, cause the processor to: receive, at a first network device, a request to establish a path through a network from the first network device to a second network device; in response to the request, determine, from among a plurality of potential paths between the first network device and the second network device, a longest acceptable path between the first network device and the second network device; and send data from the first network device to the second network device via the longest acceptable path between the first network device and the second network device.

In an embodiment, the instructions, when executed by the processor, cause the processor to determine that the longest acceptable path has failed and, in response, automatically select a failover path that is shorter than the longest acceptable path.

And in another embodiment, the instructions, when executed by the processor, cause the processor to define the longest acceptable path as a path that meets predetermined bandwidth and latency constraints for transmitting the data.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   receiving, at a first network device, a request to establish a path through a network from the first network device to a second network device, wherein the first network device and the second network device are part of a first autonomous system;
   in response to the request, determining, from among a plurality of potential paths between the first network device and the second network device, a longest acceptable path between the first network device and the second network device;
   sending data from the first network device to the second network device via the longest acceptable path between the first network device and the second network device; and
   signaling to an autonomous system boundary router of a second autonomous system that the data is to be routed via a longest path in the second autonomous system.

2. The method of claim 1, further comprising in response to determining that the longest acceptable path has failed, automatically selecting a failover path that is shorter than the longest acceptable path.

3. The method of claim 1, further comprising defining the longest acceptable path as a path that meets predetermined bandwidth and latency constraints for transmitting the data.

4. The method of claim 1, further comprising setting up the longest acceptable path using traffic engineering.

5. The method of claim 1, wherein the data comprises N3 traffic between a gNB and a user plane function (UPF) in a 5G infrastructure network.

6. The method of claim 5, further comprising receiving the request from the UPF.

7. The method of claim 5, wherein the longest acceptable path is a downlink path between the UPF and the gNB.

8. The method of claim 7, further comprising establishing a longest path uplink traffic engineering tunnel between the gNB and the UPF separate from the downlink path between the UPF and the gNB.

9. The method of claim 5, wherein the UPF comprises a first downlink interface towards the gNB that supports the longest acceptable path, and a second downlink interface towards the gNB that supports a shortest path among the plurality of potential paths between the first network device and the second network device.

10. The method of claim 1, further comprising setting a flag in an Explicit Route Object (ERO) of a path message to indicate to the autonomous system boundary router (ABR) that the data is to be routed via a longest path.

11. An apparatus comprising:
    a network interface configured to enable network communications;
    a memory configured to store logic instructions; and
    a processor, when executing the logic instructions, configured to:
      receive a request to establish a path through a network from the apparatus to a network device, wherein the apparatus and the network device are part of a first autonomous system;
      in response to the request, determine, from among a plurality of potential paths between the apparatus and the network device, a longest acceptable path between the apparatus and the network device;
      send data to the network device via the longest acceptable path between the apparatus and the network device; and
      signal to an autonomous system boundary router of a second autonomous system that the data is to be routed via a longest path in the second autonomous system.

12. The apparatus of claim 11, wherein the processor, when executing the logic instructions, is further configured to determine that the longest acceptable path has failed and, as a result, automatically select a failover path that is shorter than the longest acceptable path.

13. The apparatus of claim 11, wherein the longest acceptable path is defined as a path that meets predetermined bandwidth and latency constraints for transmitting the data.

14. The apparatus of claim 11, wherein the processor, when executing the logic instructions, is further configured to set up the longest acceptable path using traffic engineering.

15. The apparatus of claim 11, wherein the data comprises N3 traffic between a gNB and a user plane function (UPF) in a 5G infrastructure network.

16. The apparatus of claim 15, wherein the processor, when executing the logic instructions, is further configured to receive the request from the UPF.

17. The apparatus of claim 15, wherein the longest acceptable path is a downlink path between the UPF and the gNB.

18. A non-transitory computer readable storage media encoded with instructions that, when executed by a processor, cause the processor to:
    receive, at a first network device, a request to establish a path through a network from the first network device to a second network device, wherein the first network device and the second network device are part of a first autonomous system;
    in response to the request, determine, from among a plurality of potential paths between the first network device and the second network device, a longest acceptable path between the first network device and the second network device;
    send data from the first network device to the second network device via the longest acceptable path between the first network device and the second network device; and
    signaling to an autonomous system boundary router of a second autonomous system that the data is to be routed via a longest path in the second autonomous system.

19. The non-transitory computer readable storage media of claim 18, encoded with instructions that, when executed by the processor, cause the processor to determine that the longest acceptable path has failed and, as a result, automatically select a failover path that is shorter than the longest acceptable path.

20. The non-transitory computer readable storage media of claim 18, encoded with instructions that, when executed by the processor, cause the processor to define the longest acceptable path as a path that meets predetermined bandwidth and latency constraints for transmitting the data.

* * * * *